(12) United States Patent
Tsukamoto et al.

(10) Patent No.: US 10,180,717 B2
(45) Date of Patent: Jan. 15, 2019

(54) INFORMATION PROCESSING DEVICE, INFORMATION PROCESSING METHOD, AND PROGRAM

(71) Applicant: SONY CORPORATION, Tokyo (JP)

(72) Inventors: Takeo Tsukamoto, Tokyo (JP); Shuichi Konami, Chiba (JP); Tomoyuki Ito, Kanagawa (JP); Takashi Abe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/529,128

(22) PCT Filed: Nov. 19, 2015

(86) PCT No.: PCT/JP2015/082623
§ 371 (c)(1),
(2) Date: May 24, 2017

(87) PCT Pub. No.: WO2016/132617
PCT Pub. Date: Aug. 25, 2016

(65) Prior Publication Data
US 2017/0262055 A1    Sep. 14, 2017

(30) Foreign Application Priority Data
Feb. 20, 2015  (JP) .................................. 2015-031637

(51) Int. Cl.
*G06F 3/01*    (2006.01)
*G06F 21/32*   (2013.01)
(Continued)

(52) U.S. Cl.
CPC .............. *G06F 3/013* (2013.01); *G06F 21/32* (2013.01); *G06K 9/00362* (2013.01); *G07C 9/00158* (2013.01); *G07C 9/00087* (2013.01)

(58) Field of Classification Search
CPC .......... G06F 21/32; G06F 21/35; G06F 21/34; G06F 19/34; G06F 21/83; G06F 21/88; G06F 2203/0338
(Continued)

(56) References Cited

U.S. PATENT DOCUMENTS 6,353,422 B1 *  3/2002  Perlman ............... G02B 27/017
                                                    345/7
8,939,584 B2 *  1/2015  Raffle ..................... A61B 3/113
                                                    351/209
(Continued)

FOREIGN PATENT DOCUMENTS

EP    2523069 A2    11/2012
JP    2007-141002    6/2007
JP    2014-092940    5/2014

OTHER PUBLICATIONS

Sep. 24, 2018, European Search Report issued for related EP Application No. 15882718.8.

*Primary Examiner* — Mark S Blouin
(74) *Attorney, Agent, or Firm* — Paratus Law Group, PLLC

(57) ABSTRACT

There is provided an information processing device, information processing method, and program capable of realizing the authentication with high security using the movement of line of sight, the information processing device including: a line-of-sight movement identification unit configured to identify movement of line of sight of a user to a body of the user on a basis of an image of an eye of the user and an image of the body of the user positioned in a line-of-sight direction of the user, captured by an imaging unit; and a user authentication unit configured to authenticate the user on a basis of the identified movement of line of sight.

16 Claims, 13 Drawing Sheets

(51) Int. Cl.
*G06K 9/00* (2006.01)
*G07C 9/00* (2006.01)

(58) Field of Classification Search
USPC ........................................ 340/5.83
See application file for complete search history.

(56) References Cited

U.S. PATENT DOCUMENTS

| | | | |
|---|---|---|---|
| 9,092,600 B2* | 7/2015 | Scavezze | G06F 21/31 |
| 9,229,227 B2* | 1/2016 | Border | G02B 27/0093 |
| 9,329,689 B2* | 5/2016 | Osterhout | G02B 27/017 |
| 9,875,406 B2* | 1/2018 | Haddick | G06K 9/00604 |
| 9,942,420 B2* | 4/2018 | Rao | H04N 1/00244 |
| 2012/0235883 A1 | 9/2012 | Border et al. | |
| 2013/0002551 A1 | 1/2013 | Imoto et al. | |
| 2014/0125574 A1 | 5/2014 | Scavezze et al. | |

* cited by examiner

FIG.7

| USER ID | TARGET REGION AND POSTURE | LINE-OF-SIGHT PATTERN | | | |
|---|---|---|---|---|---|
| | | FIRST | SECOND | THIRD | ... |
| 0001 | STATE OF OPENING RIGHT HAND | GAZE AT LITTLE-FINGERTIP | TRACE FROM BOTTOM END TO TOP END OF LINE OF LIFE | TRACE FROM TIP TO ROOT OF MIDDLE FINGER | ... |
| 0002 | STATE OF CLENCHING LEFT HAND | GAZE AT NAIL OF THUMB | GAZE AT MOLE OF PALM | GAZE AT SECOND JOINT OF LITTLE FINGER | — |
| ... | ... | ... | ... | ... | ... |

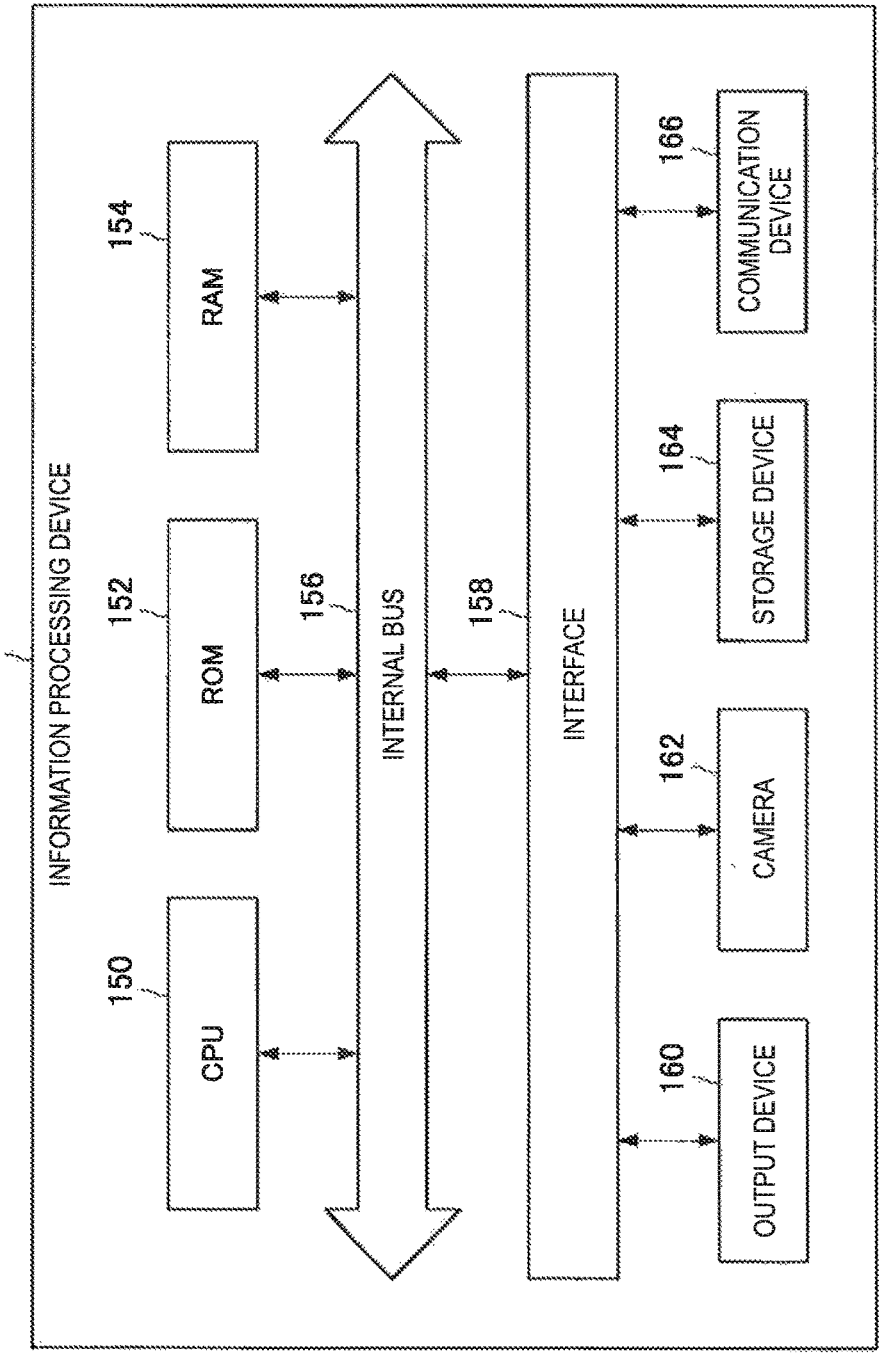

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2015/082623 (filed on Nov. 19, 2015) under 35 U.S.C. § 371, which claims priority to Japanese Patent Application No. 2015-031637 (filed on Feb. 20, 2015), which are all hereby incorporated by reference in their entirety.

TECHNICAL FIELD

The present disclosure relates to an information processing device, an information processing method, and a program.

BACKGROUND ART

In the past, a technology has been proposed to authenticate a user by using a detection result of change in line of sight of the user. For example, Patent Literature 1 discloses a technology to identify that an operation pattern including a gaze position and movement of gaze point of the user to a plurality of images displayed on a display panel and authenticate the user on the basis of a matching degree between the identified operation pattern and a determination pattern registered in advance.

CITATION LIST

Patent Literature

Patent Literature 1: JP 2014-92940A

DISCLOSURE OF INVENTION

Technical Problem

However, with the technology described in Patent Literature 1, the security of authentication is low. For example, with the technology, the number of images displayable on a display panel is limited, and thus the number of registerable determination patterns is limited. Therefore, in user authentication there is a risk that the determination pattern is identified by a third party by the third party peeking at movement of line of sight of the user, for example.

Accordingly, the present disclosure proposes a novel and improved information processing device, information processing method, and program capable of realizing the authentication with high security using the movement of line of sight.

Solution to Problem

According to the present disclosure, there is provided an information processing device including: a line-of-sight movement identification unit configured to identify movement of line of sight of a user to a body of the user on a basis of an image of an eye of the user and an image of the body of the user positioned in a line-of-sight direction of the user, captured by an imaging unit; and a user authentication unit configured to authenticate the user on a basis of the identified movement of line of sight.

Further, according to the present disclosure, there is provided an information processing method including: identifying movement of line of sight of a user to a body of the user on a basis of an image of an eye of the user and an image of the body of the user positioned in a line-of-sight direction of the user, captured by an imaging unit; and authenticating the user on a basis of the identified movement of line of sight.

Further, according to the present disclosure, there is provided a program causing a computer to function as: a line-of-sight movement identification unit configured to identify movement of line of sight of a user to a body of the user on a basis of an image of an eye of the user and an image of the body of the user positioned in a line-of-sight direction of the user, captured by an imaging unit; and a user authentication unit configured to authenticate the user on a basis of the identified movement of line of sight.

Advantageous Effects of Invention

As mentioned above, according to the present disclosure, it is possible to realize the authentication with high security using the movement of line of sight. Note that the effect described herein is not necessarily restrictive, but may be one of the effects described in the present disclosure.

BRIEF DESCRIPTION OF DRAWINGS

FIG. 7 is an explanatory diagram that illustrates an exemplary configuration of a user information DB 130 according to the embodiment.

FIG. 15 is an explanatory diagram that illustrates a hardware configuration common to the information processing device 10-1, the information processing device 10-2, and the information processing device 30.

MODE(S) FOR CARRYING OUT THE INVENTION

Figure 1:
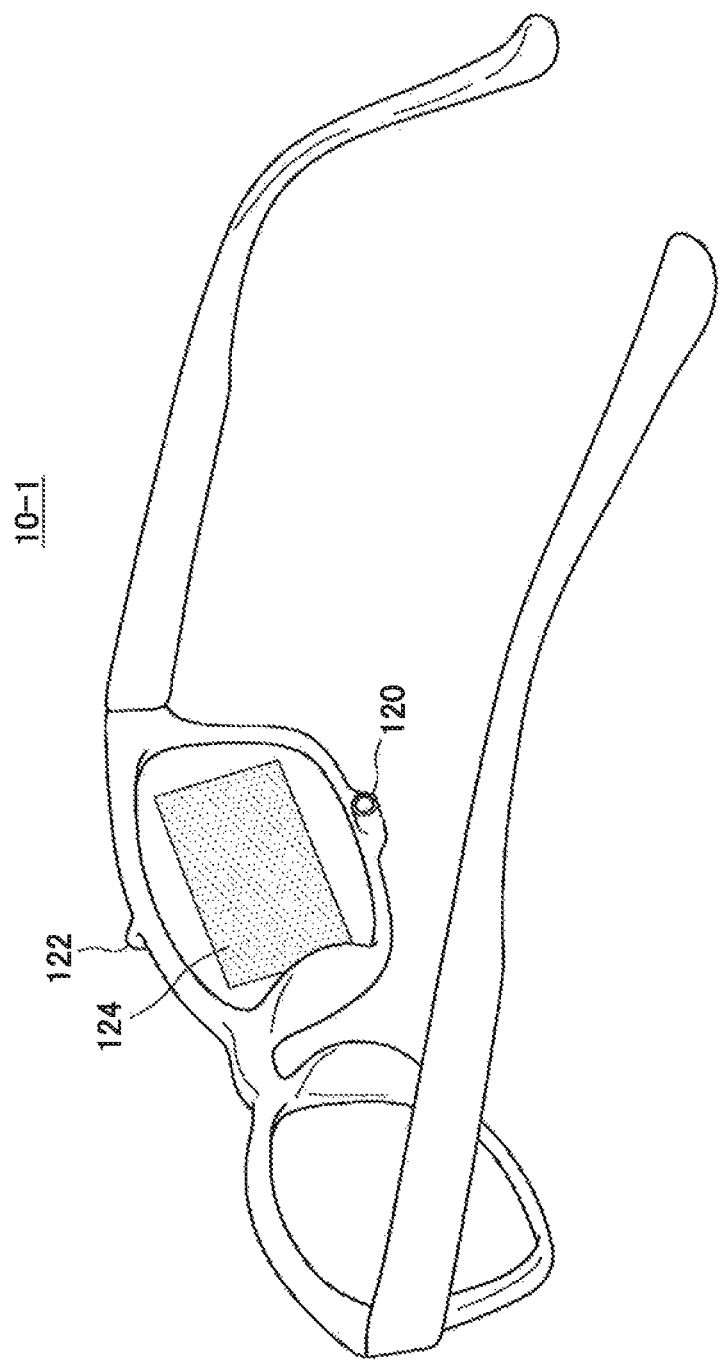
FIG. 1 is an exterior view of an information processing device 10-1 according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in this specification and the appended drawings, a plurality of structural elements having substantially the same function and structure can be distinguished by adding different alphabets to the ends of the same reference symbols. For example, a plurality of elements having substantially the same function and structure is distinguished if necessary, such as an eyeball image 20a and an eyeball image 20b. However, when a plurality of structural elements having substantially the same function and structure does not need to be distinguished, only the same reference symbol is attached. For example, when the eyeball image 20a and the eyeball image 20b do not need to be distinguished, they are simply referred to as eyeball images 20.

Further, embodiments of the invention will be now described in order of items as shown below.
1. First embodiment
2. Second embodiment
3. Third embodiment
4. Hardware configuration
5. Modification examples

1. First Embodiment

1-1. Basic Configuration of Information Processing Device 10-1

1-1-1. Basic Configuration

First, a first embodiment will be described. First of all, a description will be given of a basic configuration of an information processing device 10-1 according to the first embodiment with reference to FIG. 1.

FIG. 1 is an explanatory diagram that illustrates an exterior view of the information processing device 10-1. As shown in FIG. 1, the information processing device 10-1 is an eyeglass-type device available, for example, by attaching the device to the head of the user. Further, as shown in FIG. 1, the information processing device 10-1 includes a first imaging unit 120, a second imaging unit 122, and a display unit 124 that displays a display screen.

The first imaging unit 120 is an imaging unit directed to the inside of the information processing device 10-1. The first imaging unit 120 can capture an image of one eyeball of the user, for example, as a moving image in a state in which the information processing device 10-1 is attached to the user. Further, the second imaging unit 122 is an imaging unit directed to the outside of the information processing device 10-1. The second imaging unit 122 can capture an image of a front scenery of the user, for example, as a moving image.

Furthermore, the display unit 124 is configured as, for example, a see-through display. Consequently, the user can view the front scenery of the user via the display while visually checking the display screen displayed on the display unit 124 in a state in which the information processing device 10-1 is attached to the head.

Note that, although FIG. 1 illustrates, but not limited to, an example in which the first imaging unit 120, the second imaging unit 122, and the display unit 124 are provided to a right lens in FIG. 1, the units may be provided to a left lens.

1-12. Summary of Problems

In the above, the description has been given of the basic configuration of the information processing device 10-1 according to the first embodiment. Incidentally, in the past, such a technology has been proposed to authenticate the user by using a detection result of the change in line of sight of the user to a plurality of images displayed on the display screen. However, with a well-known technology, the security of authentication is low. For example, with the above-mentioned technology, the number of images displayable on the display screen is limited, and thus the number of registerable determination patterns is limited. Therefore, in user authentication, there is a risk that the determination pattern is identified by a third party by the third party peeking at the movement of line of sight of the user, for example.

Incidentally, there are a great number of parts of the body of the user, for example, such as the hand or leg that can be viewed by the user. Therefore, assuming a case of authenticating a user by using a pattern of movement of line of sight to the body of the user, there are a great number of registerable line-of-sight patterns, and therefore the risk that the line-of-sight pattern is identified by a third party is extremely small, even if the third party peeks at the movement of line of sight of the user.

Therefore, with the above-mentioned situation as a point of view, the information processing device 10-1 according to the first embodiment has been devised. The information processing device 10-1 according to the first embodiment can realize the authentication with high security by using the line-of-sight pattern to the body of the user.

1-2. Configuration

Figure 2:
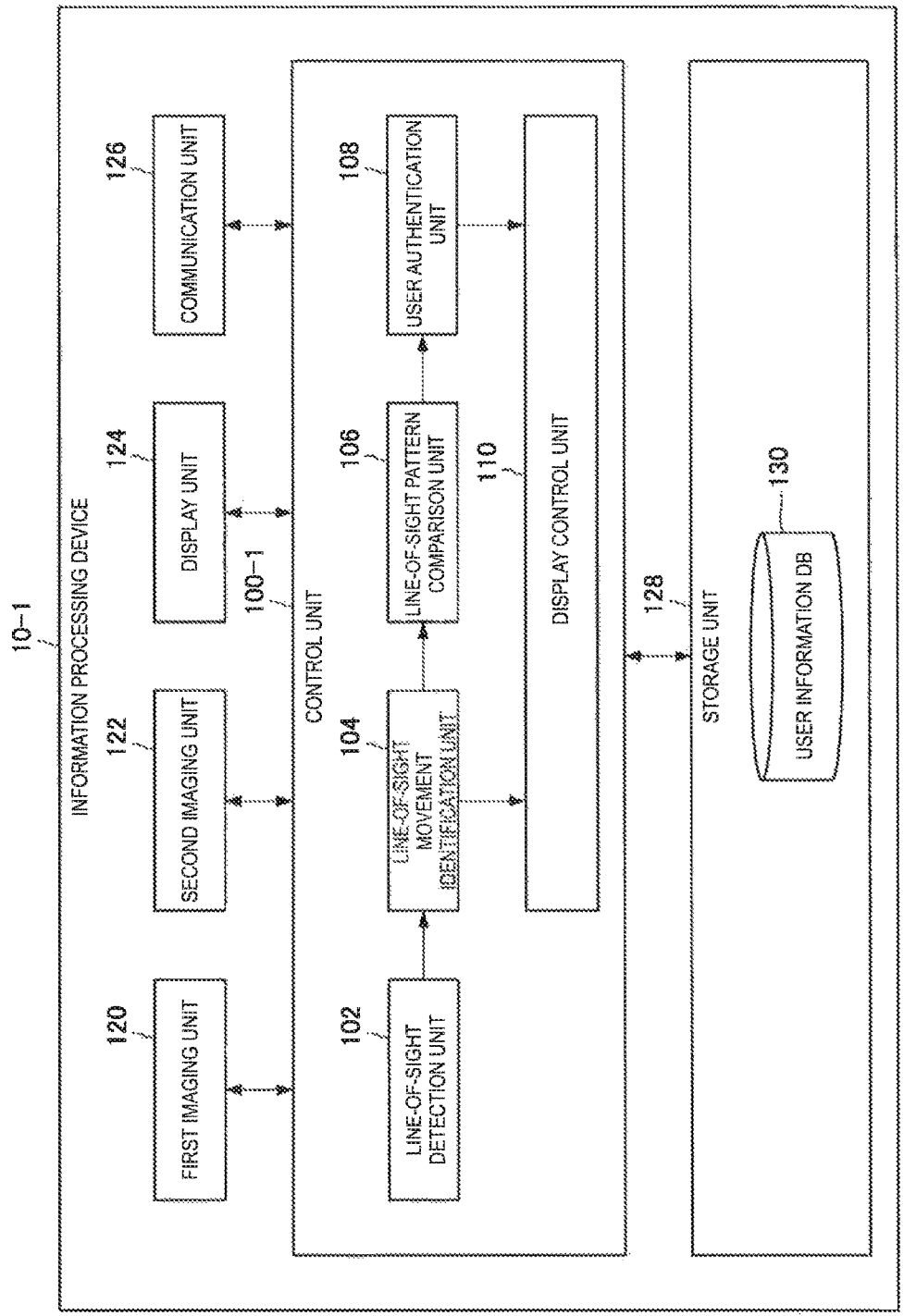
FIG. 2 is a functional block diagram that illustrates an exemplary configuration of an information processing device 10-1 according to the embodiment.

Next, a specific description will be given of the configuration of the information processing device 10-1. FIG. 2 is a functional block diagram that illustrates the configuration of the information processing device 10-1. As shown in FIG. 2, the information processing device 10-1 includes a control unit 100-1, the first imaging unit 120, the second imaging unit 122, the display unit 124, a communication unit 126, and a storage unit 128.

1-2-1. Control Unit 100-1

The control unit 100-1 uses hardware components, such as a central processing unit (CPU) 150 and a random access memory (RAM) 154 to be described below, which are incorporated in the information processing device 10-1, to totally control the operation of the information processing device 10-1. Further, as shown in FIG. 2, the control unit 100-1 includes a line-of-sight detection unit 102, a line-ofsight movement identification unit 104, a line-of-sight pattern comparison unit 106, a user authentication unit 108, and a display control unit 110.

1-2-2. Line-of-Sight Detection Unit 102

The line-of-sight detection unit 102 detects a line-of-sight direction of the user on the basis of the image of the eyeball of the user captured by the first imaging unit 120. For example, the line-of-sight detection unit 102 first identifies the position of the black eye of the eyeball included in the image of the eyeball of the user captured by the first imaging unit 120, and detects the line-of-sight direction of the user on the basis of the identified position. More specifically, the line-of-sight detection unit 102 identifies, for example, the line-of-sight direction of the user by performing pattern matching between learning data of the image of the eyeball for each line-of-sight direction stored in the storage unit 128 and the image of the eyeball captured by the first imaging unit 120.

Figure 3:
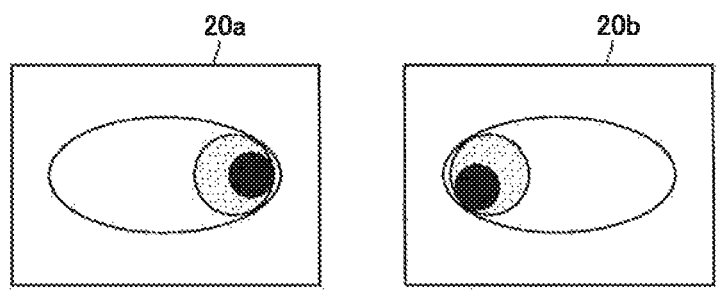
FIG. 3 is an explanatory diagram that illustrates examples of images of eyeballs of a user according to the embodiment.

Herein, a specific description will be given of the above-mentioned functions with reference to FIG. 3. FIG. 3 is an explanatory diagram that illustrates an example of the image of the eyeball (eyeball image 20) captured by the first imaging unit 120. For example, the line-of-sight detection unit 102 identifies, as "left", the line-of-sight direction of the user in an eyeball image 20a on the basis of the eyeball image 20a shown in FIG. 3 and the learning data. Similarly, the line-of-sight detection unit 102 identifies, as "right down", the line-of-sight direction of the user in an eyeball image 20b shown in FIG. 3.

1-2-3. Line-of-Sight Movement Identification Unit 104

1-2-3-1. Identification Example 1

The line-of-sight movement identification unit 104 identifies the movement of line of sight of the user to the body of the user on the basis of the line-of-sight direction of the user detected by the line-of-sight detection unit 102 and the image of the body of the user captured by the second imaging unit 122. For example, the line-of-sight movement identification unit 104 first calculates an intersection point (hereinbelow, also referred to as a viewing position) of a half linear-line extended to the line-of-sight direction of the user detected by the line-of-sight detection unit 102 from the position of the eye of the user and a region of the body of the user, thereby identifying a region viewed by the user. Then, the line-of-sight movement identification unit 104 identifies the line-of-sight operation of the user to the identified region.

Herein, the line-of-sight operation of the user includes, for example, gaze to a region of the user or trace of line of sight. Note that the trace of line of sight is a locus drawn with the line of sight by the user, and has various shapes, for example, a linear line, curved line, or circle.

For example, when it is detected that the user views the same position for a predetermined time or more, the line-of-sight movement identification unit 104 identifies that the user gazes at the corresponding position. Then, when it is detected that the viewing position is continuously moved from the start point viewed by the user for less than a predetermined time, the line-of-sight movement identification unit 104 identifies that the user traces the corresponding region from the start point.

Figure 4:
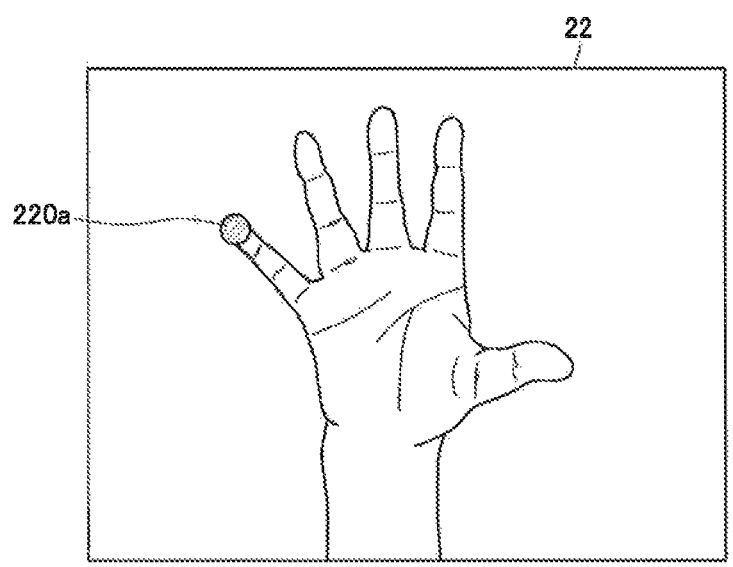
FIG. 4 is an explanatory diagram that illustrates an example of an image of a right hand of the user according to the embodiment.

Herein, a specific description will be given of the functions with reference to FIGS. 4 and 5. FIG. 4 is an explanatory diagram that illustrates an example (right-hand image 22) of an image of the right hand of the user captured by the second imaging unit 122. Note that, in FIG. 4, it is assumed that the user gazes at a little-fingertip 220a.

For example, the line-of-sight movement identification unit 104 identifies that a region viewed by the user is the little-fingertip 220a by calculating the viewing position on the basis of the line-of-sight direction of the user detected by the line-of-sight detection unit 102. Then, when it is detected that the user views the same position for a predetermined time or more, the line-of-sight movement identification unit 104 identifies that the user gazes at the little-fingertip 220a.

Figure 5:
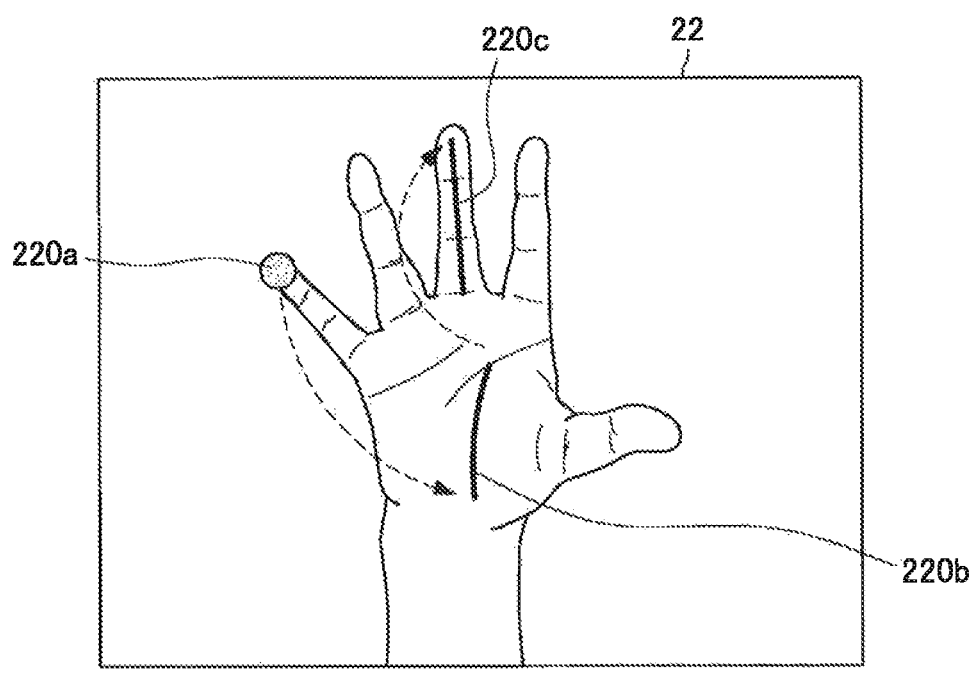
FIG. 5 is an explanatory diagram that illustrates an example of a line-of-sight operation to the right hand of the user according to the embodiment.

Moreover, FIG. 5 is an explanatory diagram that illustrates a series of the line-of-sight operations performed by the user with the posture shown in FIG. 4. Specifically, FIG. 5 shows an example in which, as shown by a broken arrow, the user first gazes at the little-fingertip 220a, next, traces the line of life of the palm with the line of sight, and further traces the middle finger from the tip to the root with the line of sight.

For example, when it is detected that the user discontinuously moves the line-of-sight direction from the little-fingertip 220a to the bottom end of the line of life and continuously moves the viewing position along the line of life from the point after the movement for less than a predetermined time, the line-of-sight movement identification unit 104 identifies that the user traces the line of life. Further, when it is detected that the user discontinuously moves the line-of-sight direction from the top end of the line of life to the tip of the middle finger and continuously moves the viewing position from the point after the movement for less than a predetermined time, the line-of-sight movement identification unit 104 identifies that the user traces the middle finger.

1-2-3-2. Identification Example 2

Moreover, the line-of-sight movement identification unit 104 identifies individual line-of-sight operations in association with the order of the line-of-sight operations when the user performs a plurality of the line-of-sight operations. In the example shown in FIG. 5, for example, the line-of-sight movement identification unit 104 identifies the gaze to the little-fingertip 220a as a first line-of-sight operation, identifies the trace from the bottom end to the top end of the line of life as a second line-of-sight operation, and further identifies the trace from the tip to the root of the middle finger as a third line-of-sight operation.

1-2-3-3. Identification Example 3

Note that, as a modification example, the line-of-sight movement identification unit 104 can identify the line-of-sight operation of the user to the body, linked to the change in posture of the body of the user. For example, each time the posture of the body of the user is changed, the line-of-sight movement identification unit 104 identifies the line-of-sight operation of the user to the posture after the change. Note that the change in posture may be gesture, for example.

Figure 6:
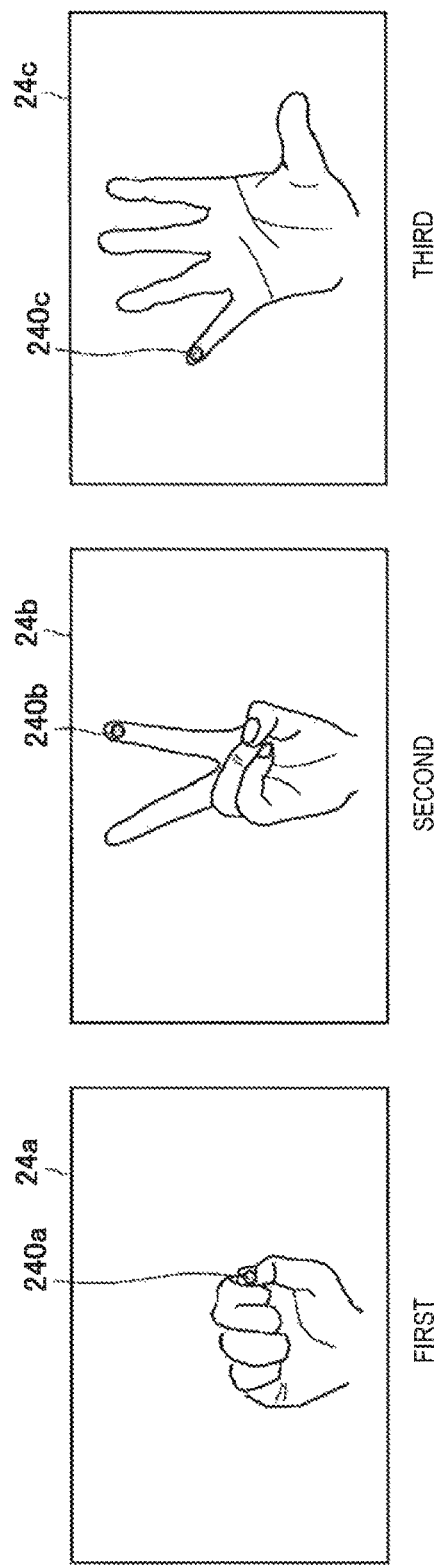
FIG. 6 is an explanatory diagram that illustrates examples of line-of-sight operations combined with gestures according to the embodiment.

Herein, a more specific description will be given of the functions with reference to FIG. 6. FIG. 6 is an explanatory diagram that illustrates an example of the image of the gesture (gesture image 24) of the right hand of the user captured by the second imaging unit 122. Note that FIG. 6 illustrates an example in which images are captured in order of a gesture image 24a, a gesture image 24b, and a gesture image 24c, that is, the user changes the shape of the right hand in order of rock, scissors, and paper.

For example, the line-of-sight movement identification unit 104 first identifies that the shape of the right hand is rock on the basis of the gesture image 24a. Then, the line-of-sight movement identification unit 104 identifies that the user gazes at a thumb tip 240a when the shape of the right hand is rock.

Moreover, the line-of-sight movement identification unit 104 identifies that the shape of the right hand is changed from rock to scissors on the basis of the gesture image 24b. Further, the line-of-sight movement identification unit 104 identifies that the user gazes at an index-fingertip 240b when the shape of the right hand is scissors. Similarly, the line-of-sight movement identification unit 104 identifies that the shape of the right hand is changed from scissors to paper on the basis of the gesture image 24c and identifies that the user gazes at a little-fingertip 240c when the shape of the right hand is paper.

According to the identification example, it is possible to identify the individual line-of-sight operations combined with the gesture by the user.

1-2-4. Line-of-Sight Pattern Comparison Unit 106

The line-of-sight pattern comparison unit 106 compares a line-of-sight pattern registered with the user information DB 130 in association with the user, with a line-of-sight pattern based on the movement of line of sight of the user identified by the line-of-sight movement identification unit 104. More specifically, the line-of-sight pattern comparison unit 106 first identifies, as the line-of-sight pattern, the arrangement of the line-of-sight operations to respective regions of the body of the user identified by the line-of-sight movement identification unit 104 in order of line-of-sight movements. Then, the line-of-sight pattern comparison unit 106 compares the identified line-of-sight pattern with the line-of-sight pattern registered with the user information DB 130, thereby determining the matching degree.

For instance, in the example shown in FIG. 5, the line-of-sight pattern comparison unit 106 identifies, as a line-of-sight pattern of the user, the arrangement of three line-of-sight operations, that is, gaze to the little-fingertip, the trace from the bottom end to the top end of the line of life, and the trace from the tip to the root of the middle finger. Then, the line-of-sight pattern comparison unit 106 compares each line-of-sight operation included in the line-of-sight pattern registered with the user information DB 130 in association with the relevant user, with each line-of-sight operation included in the line-of-sight pattern identified by the line-of-sight movement identification unit 104, in order of the line-of-sight movements, thereby determining the matching degree of the line-of-sight pattern.

1-2-4-1. User Information DB 130

The user information DB 130 is a database for recording the line-of-sight pattern in association with the user. Herein, with reference to FIG. 7, a description will be given of an exemplary configuration of the user information DB 130.

As shown in FIG. 7, in the user information DB 130, for example, a user ID 1300, a target region and posture 1302, and a line-of-sight pattern 1304 are associated with one another. Further, the line-of-sight pattern 1304 includes line-of-sight operations 1306 of respective orders, for example, a first line-of-sight operation 1306a and a second line-of-sight operation 1306b.

Herein, a user ID issued in advance to each user is recorded to the user ID 1300. Further, a region whose line-of-sight pattern is registered in association with the user of the corresponding user ID and a posture of the region are recorded to the target region and posture 1302. Furthermore, the user of the corresponding user ID and the line-of-sight pattern registered in association with the corresponding region are recorded to the line-of-sight pattern 1304. Moreover, contents of the line-of-sight operations of respective orders included in the registered line-of-sight patterns are recorded to the line-of-sight operations 1306 of respective orders.

For example, a first record shown in FIG. 7 shows a registration example of the line-of-sight pattern to the right hand in an opened state about the user having a user ID as "0001". Then, it is shown that a first line-of-sight operation included in the line-of-sight pattern is "gaze to the little-fingertip", a second line-of-sight operation is "trace from the bottom end to the top end of the line of life", and a third line-of-sight operation is "trace from the tip to the root of the middle-finger".

1-2-5. User Authentication Unit 108

The user authentication unit 108 authenticates the user on the basis of a comparison result of the line-of-sight pattern comparison unit 106. More specifically, when the matching degree determined by the line-of-sight pattern comparison unit 106 is a predetermined threshold or more, the user authentication unit 108 determines that the user is a valid user. In addition, when the determined matching degree is less than a predetermined threshold, the user authentication unit 108 does not determine that the user is a valid user.

Further, the user authentication unit 108 can also send the authentication result to another device, i.e., the communication unit 126 which will be described later.

1-2-6. Display Control Unit 110

Each time the line-of-sight movement identification unit 104 identifies the line-of-sight movement, the display control unit 110 causes the display unit 124 which will be described later to sequentially display the display indicating the identified line-of-sight movement. For example, in the example shown in FIG. 5, when the line-of-sight movement identification unit 104 confirms that the user gazes at the little-fingertip 220a, the display control unit 110 causes the display unit 124 to superimpose and display the display indicating the gaze position at the little-fingertip 220a. Similarly, each time the line-of-sight movement identification unit 104 confirms the trace of the user with the bottom end of the line of life as a start point, the display control unit 110 causes the display unit 124 to add, superimpose, and display a line of a newly confirmed part (for example, as shown by a trace 220b).

According to the display example, at the time of authentication, the user can move the line of sight while sequentially checking the line-of-sight operation recognized by the information processing device 10-1. Therefore, the user can easily perform the line-of-sight operation to the body.

1-2-7. First Imaging Unit 120

The first imaging unit 120 is an example of a first imaging unit according to the present disclosure. The first imaging unit 120 captures an image of the eyeball of the user.

1-2-8. Second Imaging Unit 122

The second imaging unit 122 is an example of a second imaging unit according to the present disclosure. The second imaging unit 122 captures an image of the body of the user positioned in the line-of-sight direction of the user.

1-2-9. Display Unit 124

The display unit 124 displays various display screens under control of the display control unit 110.

1-2-10. Communication Unit 126

The communication unit 126 receives and transmits information from/to another device (not shown) communicable with the information processing device 10-1 by, for example, wireless communication. For example, the communication unit 126 receives the user ID of the user who wears the information processing device 10-1 from another device.

1-2-11. Storage Unit 128

The storage unit 128 can store, for example, various data, such as the user information DB 130 and the user ID, and software.

Note that the configuration of the information processing device 10-1 according to the first embodiment is not limited to the above-mentioned configuration. For example, the user information DB 130 can be stored to another device communicable with the information processing device 10-1, in place of storage to the storage unit 128. Moreover, the information processing device 10-1 may further include an input unit for the user to input, for example, various information, such as the user ID, to the information processing device 10-1. Note that the input unit may receive, for example, an input with the line of sight, that is, an input based on the line-of-sight direction detected by the line-of-sight detection unit 102.

1-3. Application Example

In the above, the description has been given of the configuration according to the first embodiment. Subsequently, a description will be given of an application example of the first embodiment with reference to FIGS. 8 and 9. Note that, in this application example, such a scene is assumed to perform the user authentication with the movement of line of sight to the left arm and the left hand.

Figure 8:
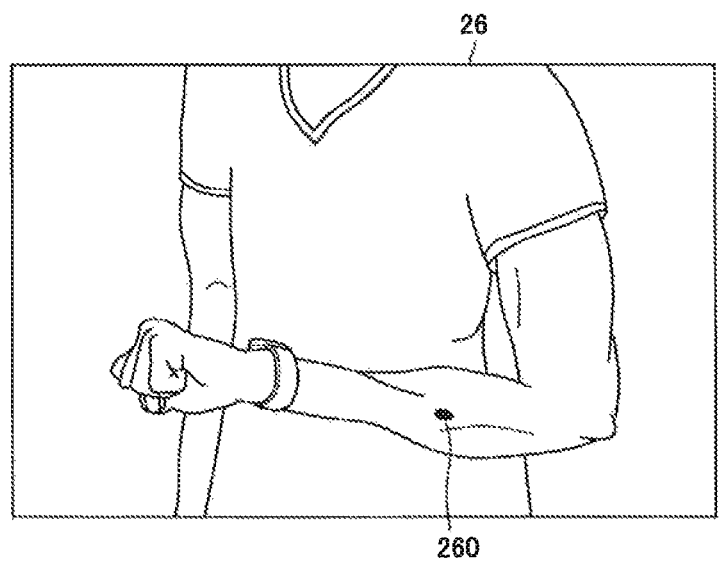
FIG. 8 is an explanatory diagram that illustrates an example of an image of a body of a user according to an application example of the embodiment.
Figure 9:
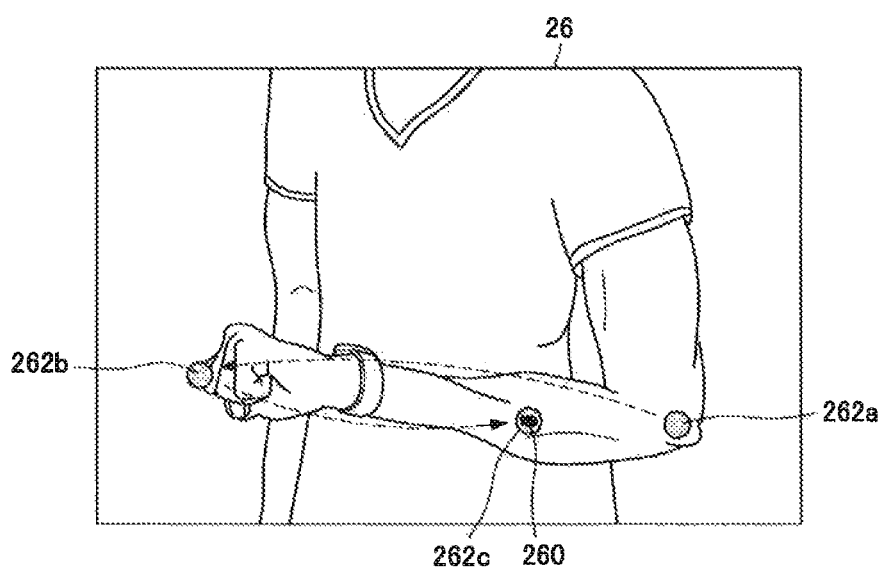
FIG. 9 is an explanatory diagram that illustrates an example of a line-of-sight operation to the body of the user according to the application example.

FIG. 8 is an image (left-arm image 26) of the forearm of the left arm and the left hand of the user captured by the second imaging unit 122. Further, FIG. 9 is an explanatory diagram that illustrates a series of the line-of-sight operations performed by the user with the posture shown in FIG. 8. Specifically, FIG. 9 shows an example as shown by a broken arrow, in which the user first gazes at a wrist 262a of the left arm, next gazes at a second joint 262b of the index finger, and further gazes at a mole 262c included in the forearm.

For example, first, the line-of-sight movement identification unit 104 identifies the gaze to the wrist 262a of the left arm as the first line-of-sight operation on the basis of the line-of-sight direction of the user detected by the line-of-sight detection unit 102 and the image of the body of the user captured by the second imaging unit 122.

Then, when it is detected that the line-of-sight direction is discontinuously moved from the wrist 262a of the left arm to the second joint 262b of the index finger and the user views the place after the movement for a predetermined time or more, the line-of-sight movement identification unit 104 identifies the gaze to the second joint 262b of the index finger as the second line-of-sight operation. Further, when it is detected that the line-of-sight direction is discontinuously moved from the second joint 262b of the index finger to the mole 262c of the forearm and the user views the place after the movement for a predetermined time or more, the line-of-sight movement identification unit 104 identifies the gaze to the mole 262c of the forearm as the third line-of-sight operation.

Then, the line-of-sight pattern comparison unit 106 identifies, as the line-of-sight pattern of the user, the arrangement of line-of-sight operations of respective orders identified by the line-of-sight movement identification unit 104. Then, the line-of-sight pattern comparison unit 106 compares each line-of-sight operation included in the line-of-sight pattern registered with the user information DB 130 in association with the relevant user, with each line-of-sight operation included in the identified line-of-sight pattern in order of the line-of-sight movements, thereby determining the matching degree of the line-of-sight pattern.

Then, when the matching degree determined by the line-of-sight pattern comparison unit 106 is a predetermined threshold or more, the user authentication unit 108 determines that the user is a valid user. Further, when the determined matching degree is less than a predetermined threshold, the user authentication unit 108 does not determine that the user is a valid user.

1-4. Operation

In the above, the description has been given of the application example of the first embodiment. Subsequently, a description will be given of an operation according to the first embodiment with reference to FIGS. 10 to 11.

Figure 10:
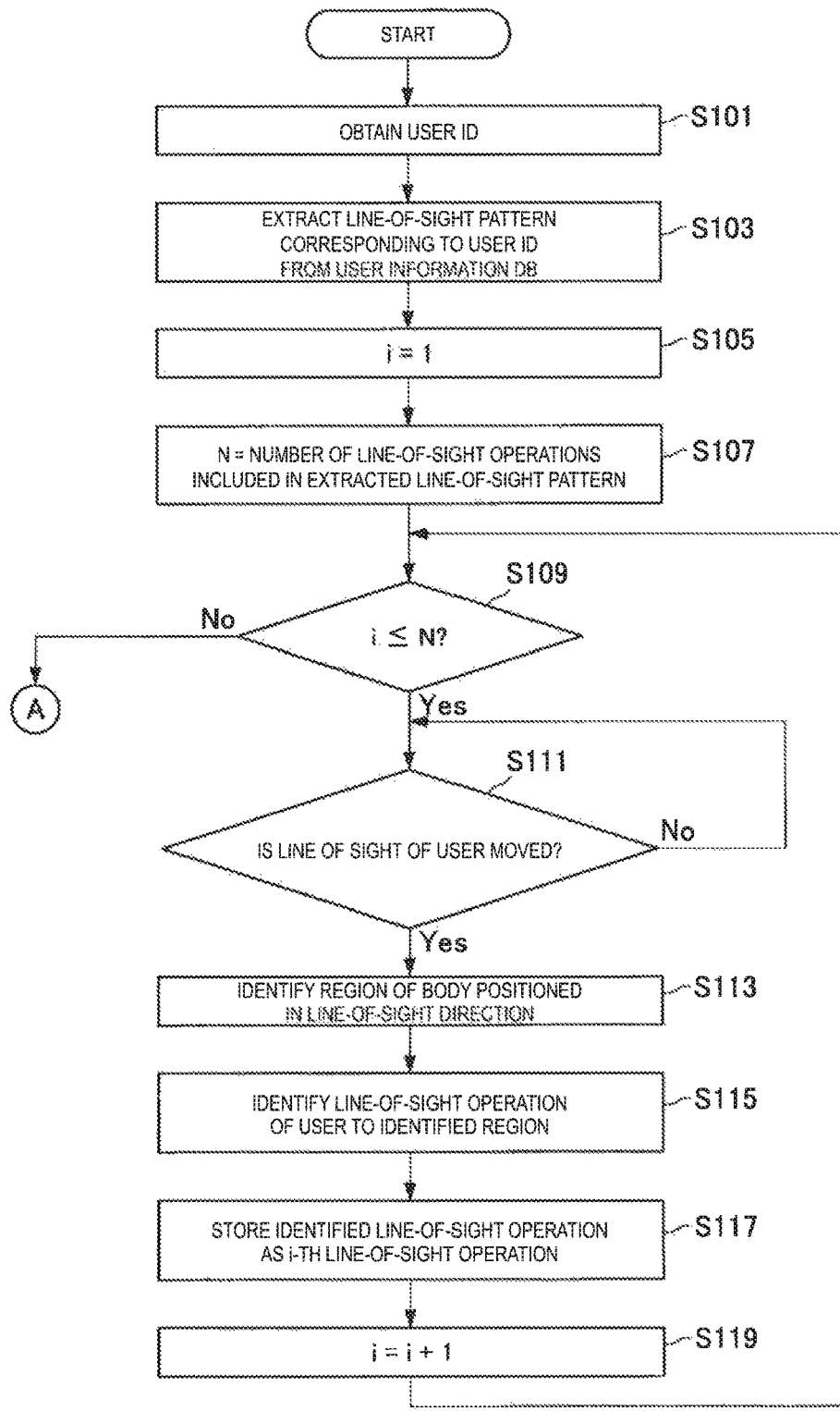
FIG. 10 is a flowchart that illustrates a part of an operation according to the embodiment.

FIG. 10 is a flowchart showing a part of the operation according to the first embodiment. As shown in FIG. 10, first, the communication unit 126 in the information processing device 10-1 receives the user ID from another device (S101). Note that, as a modification example, when the user ID is stored in advance to the storage unit 128, the control unit 100-1 may extract the user ID from the storage unit 128.

Subsequently, the line-of-sight movement identification unit 104 extracts the line-of-sight pattern registered with the user information DB 130 in association with the user ID obtained in S101 from the user information DB 130 (S103).

Subsequently, the line-of-sight movement identification unit 104 sets "1" to a variable i indicating the order of the line-of-sight operations (S105). Then, the line-of-sight movement identification unit 104 sets the number of the line-of-sight operations included in the line-of-sight pattern extracted in S103 to a constant N indicating the total number of the line-of-sight operations (S107).

Subsequently, the line-of-sight movement identification unit 104 determines whether or not the value i is N or less (S109). When i is N or less (S109: Yes), the line-of-sight movement identification unit 104 determines whether or not the line-of-sight detection unit 102 has detected the change of the line-of-sight direction of the user (S111). When the change of the line-of-sight direction of the user has not been detected (S111: No), the line-of-sight movement identification unit 104 repeats the operation in S111.

On the other hand, when the change of the line-of-sight direction of the user has been detected (S111: Yes), the line-of-sight movement identification unit 104 identifies a region of the body viewed by the user on the basis of the detected line-of-sight direction after the movement (S113).

Subsequently, the line-of-sight movement identification unit 104 identifies the line-of-sight operation of the user to the region of the body part identified in S113 (S115).

Subsequently, the line-of-sight movement identification unit 104 records the line-of-sight operation identified in S115 to the storage unit 128 as an i-th line-of-sight operation (S117).

Subsequently, the line-of-sight movement identification unit 104 adds "1" to i (S119). Thereafter, the line-of-sight movement identification unit 104 repeats the operation in S109 again.

Herein, a description will be given of an operation in a case where the value i is determined to be larger than N in S109 (S109: No) with reference to FIG. 11.

Figure 11:
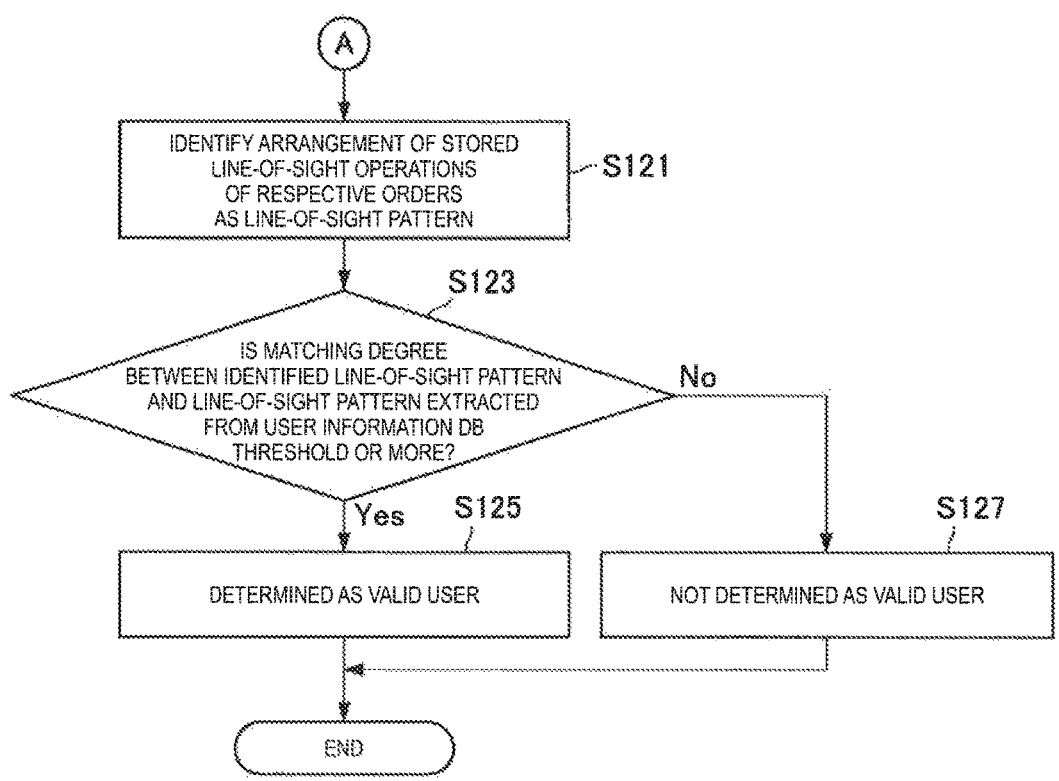
FIG. 11 is a flowchart that illustrates a part of an operation according to the embodiment.

As shown in FIG. 11, the line-of-sight pattern comparison unit 106 identifies the arrangement of line-of-sight operations of respective orders recorded in the storage unit 128 in S117 as the line-of-sight pattern (S121).

Subsequently, the line-of-sight pattern comparison unit 106 compares the line-of-sight pattern identified in S121 with the line-of-sight pattern extracted in S103, thereby determining a matching degree (S123). When the determined matching degree is a predetermined threshold or more (S123: Yes), the user authentication unit 108 determines that the user is a valid user (S125). On the other hand, when the determined matching degree is less than the predetermined threshold (S123: No), the user authentication unit 108 does not determine that the user is a valid user (S127).

1-5. Advantages

As mentioned above, with reference to, for example, FIGS. 2, 10, and 11, the information processing device 10-1 according to the first embodiment identifies the movement of line of sight of the user to the body of the user on the basis of the image of the eyeball of the user captured by the first imaging unit 120 and the image of the body of the user positioned in the line-of-sight direction of the user captured by the second imaging unit 122, and authenticates the user on the basis of the identified movement of line of sight.

For example, the number of registerable line-of-sight patterns to parts of the body, such as a hand and a leg that can be viewed by the user is extremely large. Therefore, the information processing device 10-1 can realize the authentication with high security using the movement of line of sight. For example, in user authentication, even if the third party peeks the movement of line of sight of the user, it is difficult for the third party to completely identify the line-of-sight pattern. Therefore, the line-of-sight pattern is hard to be stolen by another person and robust user authentication with high security is possible.

Further, the user can freely select a target region of the line-of-sight operation from among extremely large number of regions of the body. Furthermore, the user can arbitrarily change the line-of-sight pattern according to desire.

2. Second Embodiment

In the above, the description has been given of the first embodiment. Next, a description will be given of a second embodiment. First, a description will be given of the background for creating the second embodiment.

For example, the physical characteristics, such as a length of the arm or finger, and a position or shape of the mole, wrinkle, or vascular pattern are specific to individual. Therefore, for the user himself/herself, the physical characteristics are easily identified and unforgettable, but, are hard to be identified and hard to be remembered for another person.

Therefore, assuming that the user is authenticated with a pattern of the movement of line of sight using the physical characteristics, even if the movement of line of sight of the user is peeked by the third party in user authentication, the risk that the line-of-sight pattern is identified by the third party is extremely small. Further, the line-of-sight pattern is hard to be peeked by another person.

As will be described later, according to the second embodiment, it is possible to realize the authentication with high security by using the line-of-sight pattern using the physical characteristics.

2-1. Basic Configuration

The basic configuration of the information processing device 10-2 according to the second embodiment is similar to that of the first embodiment shown in FIG. 1.

2-2. Configuration

Figure 12:
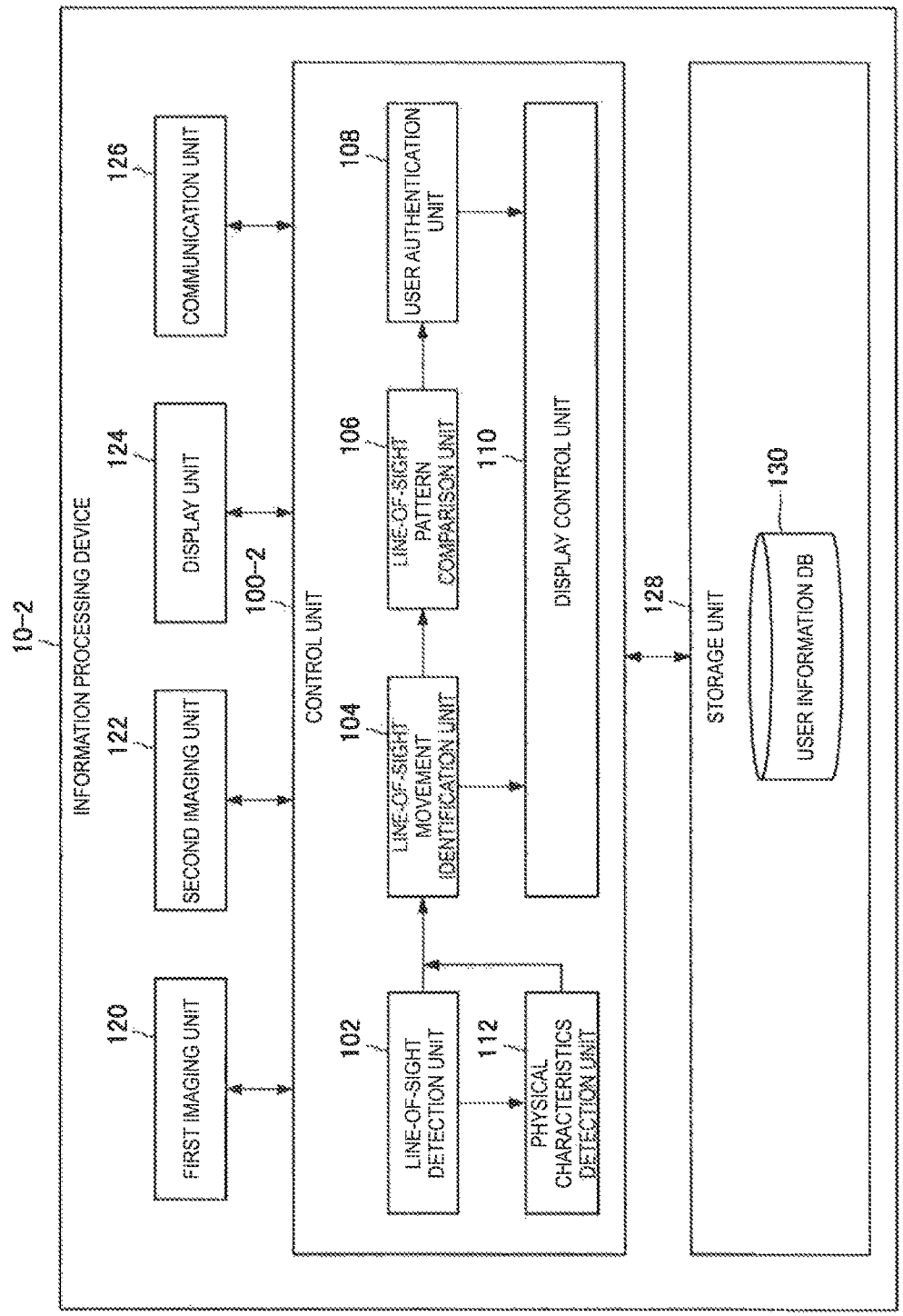
FIG. 12 is a functional block diagram that illustrates an exemplary configuration of an information processing device 10-2 according to a second embodiment of the present disclosure.

Next, a specific description will be given of the configuration of the information processing device 10-2. FIG. 12 is a functional block diagram that illustrates the configuration of the information processing device 10-2 according to the second embodiment. As shown in FIG. 12, the information processing device 10-2 has a control unit 100-2, in place of the control unit 100-1, as compared with the information processing device 10-1 according to the first embodiment. Note that a description is omitted of a function overlapped to the first embodiment below.

2-2-1. Control Unit 100-2

Comparing with the control unit 100-1, the control unit 100-2 further includes a physical characteristics detection unit 112.

2-2-2. Physical Characteristics Detection Unit 112

The physical characteristics detection unit 112 detects the physical characteristics of a part of the body of the user on the basis of the image of the body of the user positioned in the line-of-sight direction of the user captured by the second imaging unit 122.

2-2-2-1. Identify Distance to Body

For example, the physical characteristics detection unit 112 first identifies the distance from the position of the eye of the user to a region of the body part viewed by the user on the basis of the line-of-sight direction detected by the line-of-sight detection unit 102. More specifically, the physical characteristics detection unit 112 identifies the distance to the region viewed by the user, for example, on the basis of a measurement result of a distance sensor (not shown) included in the information processing device 10-2 and the image captured by the second imaging unit 120. Alternatively, when the user is positioned at a stand position that is registered in advance, for example, the user takes a posture registered in advance in a predetermined dedicated device, the physical characteristics detection unit 112 identifies the distance (fixed distance) measured in advance as the distance to the region viewed by the user.

2-2-2-2. Detect Physical Characteristics

Next, the physical characteristics detection unit 112 detects a relative length and a relative position of the relevant region on the basis of the image of the region of the body of the user captured by the second imaging unit 122 and the distance to the identified relevant region of the body. More specifically, first, the physical characteristics detection unit 112 calculates a tentative length of the relevant region and a tentative position of another place in the relevant region with the identified place as a start point on the basis of the image of the part of the body of the user captured by the second imaging unit 122. Then, the physical characteristics detection unit 112 normalizes the calculated tentative length and the tentative position on the basis of a rate of the distance from the position of the eye of the user to the relevant region of the body at time for registering the line-of-sight pattern to the distance to the identified relevant region of the body, thereby calculating a relative length of the relevant region and a relative position of the relevant another place.

Moreover, the physical characteristics detection unit 112 detects the shape, relative length, or relative position with the identified place as a start point of, for example, a mole, wrinkle, or vascular pattern included in the relevant region. Note that the identified place may be determined to a place where, for example, the user first views in the relevant region.

Herein, a more specific description will be given of the functions with reference to FIG. 4. For example, the physical characteristics detection unit 112 first identifies the distance from the position of the eye of the user to the right hand on the basis of the right-hand image 22 shown in FIG. 4. Then, the physical characteristics detection unit 112 detects characteristics of palmar creases of the right hand or respective fingers of the right hand on the basis of the right-hand image 22 and the identified distance. More specifically, the physical characteristics detection unit 112 detects the shape, relative length, or relative position with the identified place as a start point of the palmar crease, such as, the line of heart, the line of head, or the line of life. Further, the physical characteristics detection unit 112 detects a relative length of each finger and a relative position of each finger with the identified place as a start point.

2-2-3. Line-of-Sight Movement Identification Unit 104

The line-of-sight movement identification unit 104 according to the second embodiment identifies the movement of line of sight of the user to the body of the user on the basis of the line-of-sight direction of the user detected by the line-of-sight detection unit 102, the image of the body of the user captured by the second imaging unit 122, and the physical characteristics detected by the physical characteristics detection unit 112. For example, in an example shown in FIG. 5, the line-of-sight movement identification unit 104 identifies information including a relative position, relative length, or shape of a line (that is, the line of life) traced with the line of sight by the user on the palm as the second line-of-sight operation on the basis of characteristics of each palmar crease detected by the physical characteristics detection unit 112. Further, the line-of-sight movement identification unit 104 identifies information including a relative position and a relative length of a line (that is, from the tip to the root of the middle finger) traced with the line of sight by the user in the middle finger as the third line-of-sight operation on the basis of characteristics of the middle finger detected by the physical characteristics detection unit 112.

Moreover, in the example shown in FIG. 6, the line-of-sight movement identification unit 104 identifies information including a relative position of a place 240 at which the user gazed with the identified place as a start point for each shape of the right hand as the line-of-sight operation of each order on the basis of the physical characteristics of the right hand detected by the physical characteristics detection unit 112. Note that, in the example, the identified place may be the gaze position (that is, a thumb tip 240a when the shape of the right hand is rock) in the first line-of-sight operation. Consequently, the line-of-sight movement identification unit 104 identifies the gaze position of the user when the shape of the right hand is, for example, scissors as the relative position with the gaze position of the user when the shape of the right hand is rock, as a start point.

Note that functions of other structural elements included in the information processing device 10-2 are roughly similar to those of the first embodiment.

2-3. Application Example

In the above, the description has been given of the configuration according to the second embodiment. Subsequently, a description will be given of an application example of the second embodiment with reference to FIGS. 8 and 9.

In an example shown in FIG. 8, first, the physical characteristics detection unit 112 identifies the distance from the position of the eye of the user (viewed by the user) to the left arm or left hand on the basis of the line-of-sight direction detected by the line-of-sight detection unit 102.

Next, the physical characteristics detection unit 112 detects the physical characteristics of the left arm or left hand on the basis of a left-arm image 26 shown in FIG. 8 and the distance to the identified left arm or left hand. For example, the physical characteristics detection unit 112 identifies the position of a mole included in the forearm.

Next, the line-of-sight movement identification unit 104 identifies a relative position with the identified place of a region (that is, a wrist 262a of the left arm) at which the user first gazed as a start point, on the basis of the line-of-sight direction of the user detected by the line-of-sight detection unit 102 and the physical characteristics detected by the physical characteristics detection unit 112, and identifies information including the identified position as the first line-of-sight operation.

Then, in a case where it is detected that the line-of-sight direction is discontinuously moved from the wrist 262a of the left arm to a second joint 262b of the index finger and the user views the place after the movement for a predetermined time or more, the line-of-sight movement identification unit 104 identifies a relative position with the identified place of a region (that is, the second joint 262b of the index finger) currently viewed by the user as a start point, and further identifies information including the identified position as the second line-of-sight operation.

Note that the line-of-sight movement identification unit 104 may identify a relative position of the second joint 262b of the index finger on the basis of, for example, a relative distance to the second joint 262b of the index finger with the gaze position (wrist 262a of the left arm) in the first line-of-sight operation as a start point, and a relative distance to the second joint 262*b* of the index finger with the position of the mole as a start point.

Further, when it is detected that the line-of-sight direction from the second joint 262*b* of the index finger to the mole 262*c* of the forearm is discontinuously moved and the user views the place after the movement for a predetermined time or more, the line-of-sight movement identification unit 104 identifies information including the relative position of the mole 262*c* of the forearm as the third line-of-sight operation.

Then, the line-of-sight pattern comparison unit 106 identifies the arrangement of line-of-sight operations of respective orders identified by the line-of-sight movement identification unit 104 as a line-of-sight pattern of the user. Further, the line-of-sight pattern comparison unit 106 compares the respective line-of-sight operations included in the line-of-sight pattern registered with the user information DB 130 in association with the relevant user with respective line-of-sight operations included in the identified line-of-sight pattern for each order of the movements of the line of sight, thereby determining the matching degree of the line-of-sight pattern.

Then, in a case where the matching degree determined by the line-of-sight pattern comparison unit 106 is a predetermined threshold or more, the user authentication unit 108 determines that the user is a valid user. Moreover, in a case where the determined matching degree is less than the predetermined threshold, the user authentication unit 108 does not determine that the user is a valid user.

2-4. Operation

In the above, the description has been given of the configuration according to the second embodiment. Subsequently, a description will be given of an operation according to the second embodiment. Note that the operation according to the second embodiment is roughly similar to that of the first embodiment shown in FIGS. 10 and 11. Hereinbelow, a description will be given of only a step having contents different from those of the first embodiment.

In S113, first, the physical characteristics detection unit 112 detects the physical characteristics of a region of the body viewed by the user on the basis of the line-of-sight direction after the movement detected by the line-of-sight detection unit 102 and the image of the body of the user captured by the second imaging unit 122.

Moreover, in S115, the line-of-sight movement identification unit 104 identifies the line-of-sight operation of the user to the region of the body identified in S113 on the basis of the line-of-sight direction of the user detected by the line-of-sight detection unit 102 and the physical characteristics detected in S113.

2-5. Advantages

As mentioned above with reference to, for example, FIG. 12, the information processing device 10-2 according to the second embodiment detects the physical characteristics of a part of the body of the user on the basis of the image of the body of the user positioned in the line-of-sight direction of the user captured by the second imaging unit 122, identifies the movement of line of sight of the user to the body of the user on the basis of the image of the eyeball of the user captured by the first imaging unit 120 and the detected physical characteristics, and authenticates the user on the basis of the identified movement of the line of sight.

Therefore, the information processing device 10-2 can realize the authentication with higher security by using the line-of-sight pattern using the physical characteristics. For example, even if the movement of the line-of-sight of the user is peeked by the third party in user authentication, the physical characteristics are specific to individual and are hard to be identified for the third party. Therefore, it is extremely difficult for the third party to completely identify the line-of-sight pattern. Therefore, the line-of-sight pattern using the physical characteristics is not easily stolen by another person and the robust user authentication is possible with higher security.

Moreover, for example, in a case of the user authentication using only the physical characteristics, such as fingerprint authentication, it is difficult to change authentication information, and therefore, if the authentication information is leaked, the influence is serious. On the other hand, with the authenticating method according to the second embodiment, the line-of-sight pattern can be easily changed, and therefore, even if the line-of-sight pattern is leaked, advantageously, damage can be reduced.

3. Third Embodiment

In the above, the description has been given of the second embodiment. Next, a third embodiment will be described.

As mentioned above, it is assumed that the information processing device 10-1 according to the first embodiment and the information processing device 10-2 according to the second embodiment include two types of the imaging units, that is, the first imaging unit 120 for capturing an image of the eyeball of the user and the second imaging unit 122 for capturing an image of the body of the user.

As will be described later, according to the third embodiment, a device having only one type of the imaging unit allows for identifying the movement of line of sight of the user to the body and authenticating the user.

3-1. Basic Configuration

First, a description will be given of the basic configuration of the information processing device 30 according to the third embodiment with reference to FIG. 13.

Figure 13:
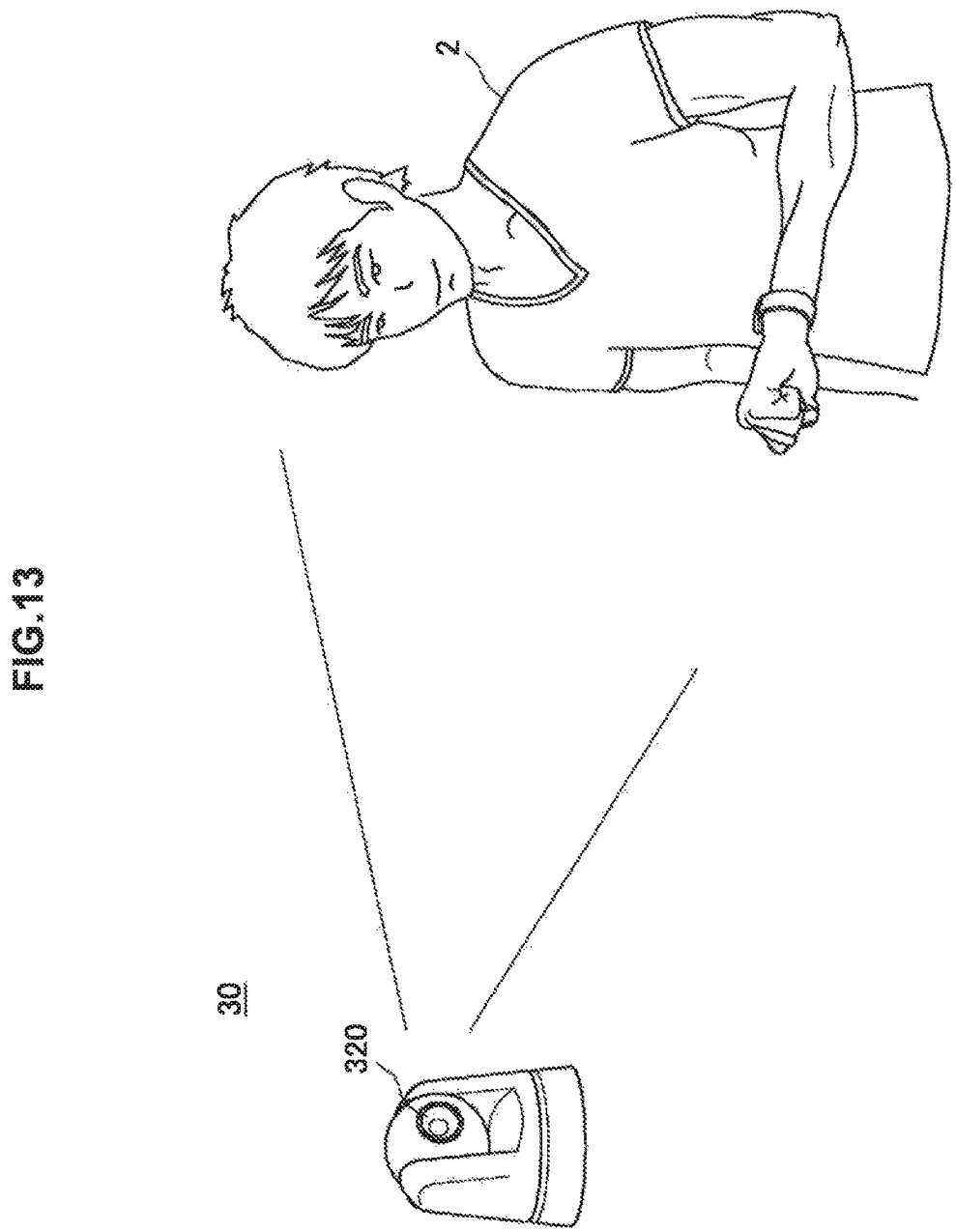
FIG. 13 is an exterior view of an information processing device 30 according to a third embodiment of the present disclosure.

FIG. 13 is an explanatory diagram that illustrates an exterior view of the information processing device 30. As shown in FIG. 13, the information processing device 30 includes an imaging unit 320 that can capture, for example, images of the eyeball of a user 2 and a part of the body of the user 2, such as the arm. The information processing device 30 may be provided, for example, at an entrance of a house. Further, the information processing device 30 may be configured as a part of an authenticating system that performs user authentication for the purpose of unlocking a door of the entrance.

3-2. Configuration

Figure 14:
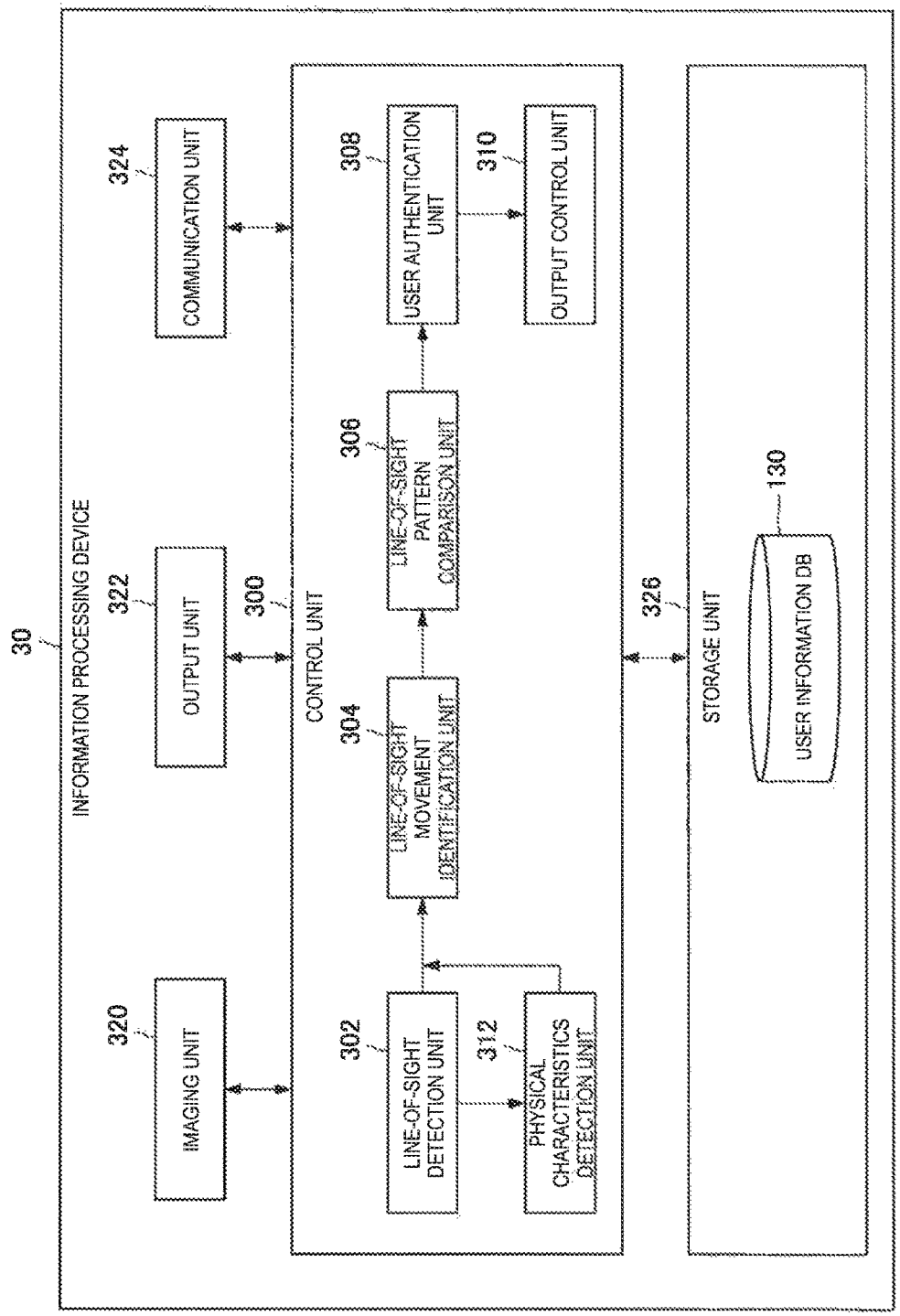
FIG. 14 is a functional block diagram that illustrates an exemplary configuration of the information processing device 30 according to the embodiment.

Next, a specific description will be given of the configuration of the information processing device 30. FIG. 14 is a functional block diagram that illustrates the configuration of the information processing device 30 according to the third embodiment. As shown in FIG. 14, the information processing device 30 includes a control unit 300, the imaging unit 320, an output unit 322, a communication unit 324, and a storage unit 326. Note that a description is omitted of the functions overlapped to the second embodiment below.

3-2-1. Control Unit 300

The control unit 300 entirely controls operations of the information processing device 30. Further, as shown in FIG. 14, the control unit 300 includes a line-of-sight detection unit 302, a line-of-sight movement identification unit 304, a line-of-sight pattern comparison unit 306, a user authentication unit 308, an output control unit 310, and a physical characteristics detection unit 312.

3-2-2. Line-of-Sight Detection Unit 302

The line-of-sight detection unit 302 detects the line-of-sight direction of the user on the basis of the image of the eyeball of the user captured by the imaging unit 320 which will be described later. Note that specific functions are roughly similar to those of the line-of-sight detection unit 102 according to the second embodiment.

3-2-3. Physical Characteristics Detection Unit 312

The physical characteristics detection unit 312 detects the physical characteristics of a part of the body of the user on the basis of the image of the body of the user positioned in the line-of-sight direction of the user captured by the imaging unit 320. Note that specific functions are roughly similar to those of the physical characteristics detection unit 112 according to the second embodiment.

3-2-4. Line-of-Sight Movement Identification Unit 304

The line-of-sight movement identification unit 304 identifies the movement of line of sight of the user to the body of the user on the basis of the line-of-sight direction of the user detected by the line-of-sight detection unit 102, the image of the body of the user captured by the imaging unit 320, and the physical characteristics detected by the physical characteristics detection unit 312. Note that specific functions are roughly similar to those of the line-of-sight movement identification unit 104 according to the second embodiment.

3-2-5. Output Control Unit 310

The output control unit 310 allows the output unit 322 which will be described later to output an authentication result of the user authentication unit 308. For example, the output control unit 310 allows the output unit 322 to output sound for informing the authentication result.

3-2-6. Imaging Unit 320

The imaging unit 320 simultaneously captures the image of the eyeball of the user and the image of the body of the user positioned in the line-of-sight direction of the user.

3-2-7. Output Unit 322

The output unit 322 outputs sound or video image under the control of the output control unit 310.

Note that the line-of-sight pattern comparison unit 306, the user authentication unit 308, the communication unit 324, and the storage unit 326 are similar to the line-of-sight pattern comparison unit 106, the user authentication unit 108, the communication unit 126, and the storage unit 128 according to the second embodiment, respectively.

In the above, the description has been given of the configuration of the information processing device 30 according to the third embodiment, but it is not limited to the above-mentioned configuration. For example, the information processing device 30 may not include one or more of the output control unit 310, the output unit 322, and the communication unit 324.

3-3. Operation

An operation according to the third embodiment is roughly similar to the operation according to the second embodiment as mentioned above in 2 to 4 paragraphs.

3-4. Advantages

As mentioned above with reference to, for example, FIGS. 13 and 14, the information processing device 30 according to the third embodiment detects the physical characteristics about a part of the body of the user on the basis of the image of the body of the user positioned in the line-of-sight direction of the user captured by the imaging unit 320, identifies the movement of line of sight of the user to the body of the user on the basis of the image of the eyeball of the user captured by the imaging unit 320 and the detected physical characteristics, and authenticates the user on the basis of the identified movement of line of sight. Therefore, since the roughly same functions as those according to the second embodiment are realized, the same advantages as those according to the second embodiment are obtained.

4. Hardware Configuration

Next, a hardware configuration of the information processing device 10-1, the information processing device 10-2, and the information processing device 30 will be described with reference to FIG. 15. As illustrated in FIG. 15, the information processing device 10-1 (or the information processing device 10-2 or the information processing device 30) includes a CPU 150, a read only memory (ROM) 152, a RAM 154, an internal bus 156, an interface 158, an output device 160, a camera 162, a storage device 164, and a communication device 166.

4-1. CPU 150

The CPU 150 functions as a computation processing device and a control device. The CPU 150 provides the function of the control unit 100-1 (or the control unit 100-2 or the control unit 300). Note that the CPU 150 is configured with a processor such as a microprocessor.

4-2. ROM 152

The ROM 152 stores programs and control data such as calculation parameters used by the CPU 150, etc.

4-3. RAM 154

The RAM 154 temporarily stores the programs or the like that are executed by the CPU 150, for example.

4-4. Internal Bus 156

The internal bus 156 is composed of a CPU bus and the like. This internal bus 156 connects the CPU 150, the ROM 152, and the RAM 154 to each other.

4-5. Interface 158

The interface 158 connects the output device 160, the camera 162, the storage device 164, and the communication device 166 to the internal bus 156. For example, the storage device 164 exchanges data with the CPU 150 via the interface 158 and the internal bus 156.

4-6. Output Device 160

The output device 160 includes, for example, a liquid crystal display (LCD) device, an organic light emitting diode (OLED) device, and a display device, such as a lamp. The display device displays an image generated by the CPU 150.

Further, the output device 160 includes a sound output device, such as a speaker. The sound output device converts sound data or the like into sound and outputs the sound. The output device 160 functions as the display unit 124 or the output unit 322.

4-7. Camera 162

The camera 162 has a function for capturing a still image or a moving image by forming an image of external scene on an image sensor such as a charge coupled device (CCD) and a complementary metal oxide semiconductor (CMOS) for example, through a lens. This camera 162 functions as the first imaging unit 120, the second imaging unit 122, or the imaging unit 320.

4-8. Storage Device 164

The storage device 164 is a device for data storage which functions as the storage unit 128 or the storage unit 326. The storage device 164 includes a storage medium, a record device that records data in the storage medium, a reading device that reads out data from the storage medium, a deleting device that deletes the data recorded in the storage medium, or the like, for example.

4-9. Communication Device 166

The communication device 166 is a communication interface that is composed of a communication device and the like for connecting to a communication network such as a public network and the Internet, for example. Further, the communication device 166 may be a wireless LAN compatible communication device, a long term evolution (LTE) compatible communication device, or a wire communication device that communicates via a wire. This communication device 166 functions as the communication unit 126 or the communication unit 324.

5. Modification Examples

The preferred embodiments) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

5-1. First Modification Example

For example, in each of the above-mentioned embodiments, in a case where a user ID has been received or inputted, that is, it is assumed that a user is identified, the description has been given of the example of authenticating the user. However, it is not limited to the example. For example, the information processing device 30 (or, the information processing device 10-1 or the information processing device 10-2) can also identify which user is a person as a capturing target on the basis of line-of-sight patterns of all users recorded to the user information DB 130.

Specifically, the information processing device 30 first compares the line-of-sight pattern based on the movement of the line of sight of the user identified by the line-of-sight movement identification unit 304 with the line-of-sight patterns of the users (or all users) belonging to a specific group registered with the user information DB 130, respectively. Then, the information processing device 30 can identify the user with the highest determined matching degree as a target person.

According to the modification example, when all family members are registered in advance as one group, the information processing device 30 can identify who in the family the person of the image capturing target is, even if the user ID is not input, for example.

5-2. Second Modification Example

Further, each embodiment can provide a computer program for causing hardware such as the CPU 150, the ROM 152, and the RAM 154 to provide a function equivalent to each configuration of the above information processing device 10-1, the information processing device 10-2, or the information processing device 30. Further, a recording medium in which the computer program is recorded is provided.

Additionally, the present technology may also be configured as below.

(1)

An information processing device including:

a line-of-sight movement identification unit configured to identify movement of line of sight of a user to a body of the user on a basis of an image of an eye of the user and an image of the body of the user positioned in a line-of-sight direction of the user, captured by an imaging unit; and a user authentication unit configured to authenticate the user on a basis of the identified movement of line of sight.

(2)

The information processing device according to (1), further including:

a line-of-sight pattern comparison unit configured to compare a line-of-sight pattern registered with a database in association with the user with a line-of-sight pattern based on the movement of line of sight of the user identified by the line-of-sight movement identification unit, in which the user authentication unit authenticates the user on a basis of a comparison result of the line-of-sight pattern comparison unit.

(3)

The information processing device according to (2), in which the user authentication unit determines that the user is a valid user in a case where a matching degree of the line-of-sight pattern determined by the line-of-sight pattern comparison unit is a predetermined threshold or more.

(4)

The information processing device according to (2) or (3), further including:

a physical characteristics detection unit configured to detect physical characteristics on a part of the body of the user on a basis of the image of the body of the user, in which the line-of-sight movement identification unit identifies the movement of line of sight of the user to the body of the user on a basis of the image of the eye of the user and the detected physical characteristics.

(5)
The information processing device according to any one of (2) to (4),
in which the line-of-sight pattern is a pattern of a line-of-sight operation to one or more regions of the body of the user.

(6)
The information processing device according to (5),
in which the line-of-sight pattern registered with the database is a pattern of a line-of-sight operation to each of one or more regions of the body of the user associated with an order of movement of the line of sight.

(7)
The information processing device according to (5),
in which the line-of-sight pattern registered with the database is a pattern of a line-of-sight operation to each of one or more regions of the body of the user associated with an order of change of a posture of the body of the user.

(8)
The information processing device according to any one of (5) to (7),
in which the line-of-sight operation includes gaze to a region of the body of the user or a trace of line of sight.

(9)
The information processing device according to any one of (4) to (8),
in which the physical characteristics include a position or a shape of a mole, a wrinkle, or a vascular pattern.

(10)
The information processing device according to any one of (1) to (9), further including:
a display control unit configured to cause a display unit to sequentially display indication of the identified movement of line of sight each time the line-of-sight movement identification unit identifies the movement of line of sight.

(11)
The information processing device according to (10), further including:
the display unit.

(12)
The information processing device according to any one of (1) to (11),
in which the imaging unit includes a first imaging unit configured to capture the image of the eye of the user and a second imaging unit configured to capture the image of the body of the user positioned in the line-of-sight direction of the user.

(13)
The information processing device according to any one of (1) to (12),
in which the information processing device is an eyeglass-type device.

(14)
An information processing method including:
identifying movement of line of sight of a user to a body of the user on a basis of an image of an eye of the user and an image of the body of the user positioned in a line-of-sight direction of the user, captured by an imaging unit; and
authenticating the user on a basis of the identified movement of line of sight.

(15)
A program causing a computer to function as:
a line-of-sight movement identification unit configured to identify movement of line of sight of a user to a body of the user on a basis of an image of an eye of the user and an image of the body of the user positioned in a line-of-sight direction of the user, captured by an imaging unit; and
a user authentication unit configured to authenticate the user on a basis of the identified movement of line of sight.

REFERENCE SIGNS LIST

10-1, 10-2, 30 information processing device
100-1, 100-2, 300 control unit
102, 302 line-of-sight detection unit
104, 304 line-of-sight movement identification unit
106, 306 line-of-sight pattern comparison unit
108, 308 user authentication unit
110 display control unit
120 first imaging unit
122 second imaging unit
124 display unit
126, 324 communication unit
128, 326 storage unit
130 user information DB
310 output control unit
320 imaging unit
322 output unit

The invention claimed is:
1. An information processing device comprising:
a line-of-sight movement identification unit configured to identify movement of line of sight of a user to a body of the user based on an image of an eye of the user and an image of the body of the user positioned in a line-of-sight direction of the user, wherein each image is captured by an imager; and
a user authentication unit configured to authenticate the user based on the identified movement of line of sight,
wherein the line-of-sight movement identification unit identifies movement of the line of sight of the user according to a shape of the body of the user positioned in the line-of-sight direction of the user, and
wherein the line-of-sight movement identification unit and the user authentication unit are each implemented via at least one processor.
2. The information processing device according to claim 1, further comprising:
a line-of-sight pattern comparison unit configured to compare a line-of-sight pattern registered with a database in association with the user with a line-of-sight pattern based on the movement of line of sight of the user identified by the line-of-sight movement identification unit,
wherein the user authentication unit authenticates the user based on a comparison result of the line-of-sight pattern comparison unit, and
wherein the light-of-sight pattern comparison unit is implemented via at least one processor.
3. The information processing device according to claim 2,
wherein the user authentication unit determines that the user is a valid user in a case where a matching degree of the line-of-sight pattern determined by the line-of-sight pattern comparison unit is a predetermined threshold or more.

4. The information processing device according to claim 2, further comprising:
- a physical characteristics detection unit configured to detect physical characteristics on a part of the body of the user based on the image of the body of the user,
- wherein the line-of-sight movement identification unit identifies the movement of line of sight of the user to the part of the body of the user based on the image of the eye of the user and the detected physical characteristics, and
- wherein the physical characteristics detection unit is implemented via at least one processor.

5. The information processing device according to claim 2,
- wherein the line-of-sight pattern is a pattern of a line-of-sight operation to one or more regions of the body of the user.

6. The information processing device according to claim 5,
- wherein the line-of-sight pattern registered with the database is a pattern of a line-of-sight operation to each of one or more regions of the body of the user associated with an order of movement of the line of sight.

7. The information processing device according to claim 5,
- wherein the line-of-sight pattern registered with the database is a pattern of a line-of-sight operation to each of one or more regions of the body of the user associated with an order of change of a posture of the body of the user.

8. The information processing device according to claim 5,
- wherein the line-of-sight operation includes gaze to a region of the body of the user or a trace of line of sight.

9. The information processing device according to claim 4,
- wherein the physical characteristics include a position or a shape of a mole, a wrinkle, or a vascular pattern.

10. The information processing device according to claim 1, further comprising:
- a display control unit configured to cause a display to sequentially display indication of the identified movement of line of sight each time the line-of-sight movement identification unit identifies the movement of line of sight,
- wherein the display control unit is implemented via at least one processor.

11. The information processing device according to claim 10, further comprising:
- the display.

12. The information processing device according to claim 1,
- wherein the imager includes a first imager configured to capture the image of the eye of the user and a second imager configured to capture the image of the body of the user positioned in the line-of-sight direction of the user.

13. The information processing device according to claim 1,
- wherein the information processing device comprises an eyeglass-type device.

14. An information processing method, executed by at least one processor, the method comprising:
- identifying movement of line of sight of a user to a body of the user based on an image of an eye of the user and an image of the body of the user positioned in a line-of-sight direction of the user, wherein each image is captured by an imager; and
- authenticating the user based on the identified movement of line of sight,
- wherein the movement of the line of sight of the user is identified according to a shape of the body of the user positioned in the line-of-sight direction of the user.

15. A non-transitory computer-readable medium having embodied thereon a program, which when executed by a computer, causes the computer execute a method, the method comprising:
- identifying movement of line of sight of a user to a body of the user based on an image of an eye of the user and an image of the body of the user positioned in a line-of-sight direction of the user, wherein each image is captured by an imager; and
- authenticating the user based on the identified movement of line of sight,
- wherein the movement of the line of sight of the user is identified according to a shape of the body of the user positioned in the line-of-sight direction of the user.

16. The information processing device according to claim 1,
- wherein the line-of-sight movement identification unit identifies movement of the line of sight of the user in an order according to each shape of a plurality of shapes of the body of the user positioned in the line-of-sight direction of the user.

* * * * *